S. B. WILLIAMS.
Smut Machine.
No. 36,545.
Patented Sept. 23, 1862.
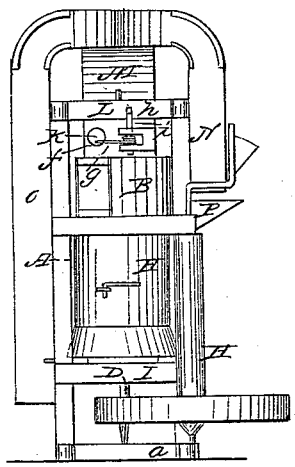
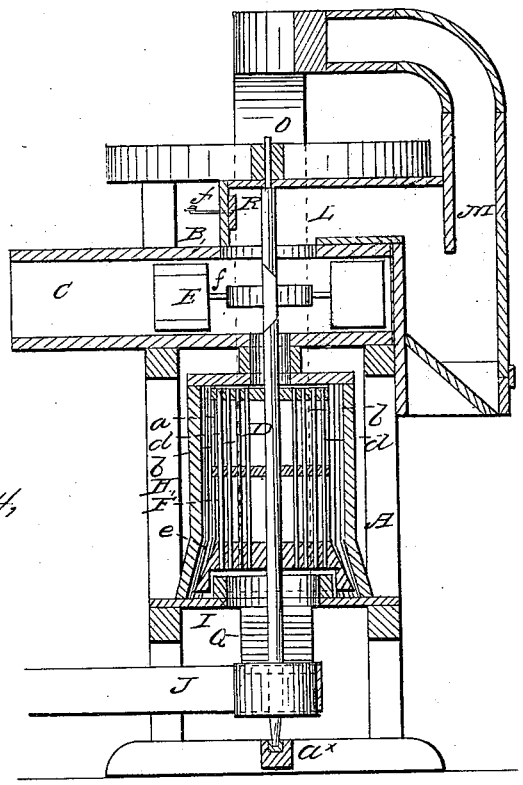
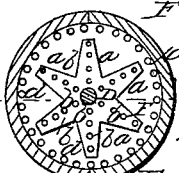
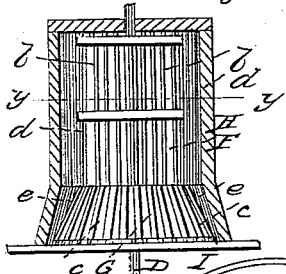
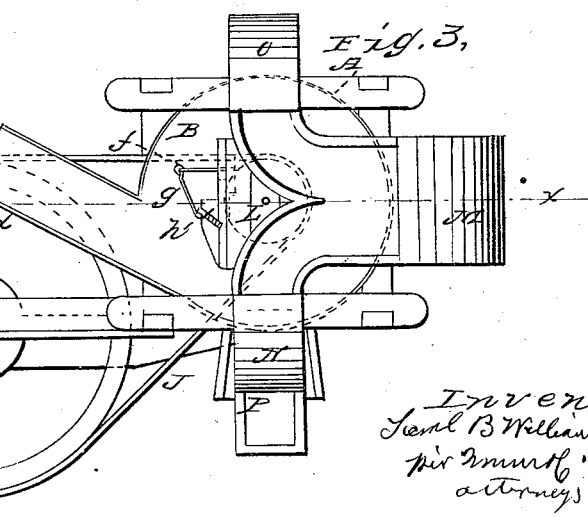

UNITED STATES PATENT OFFICE.

SAMUEL B. WILLIAMS, OF BARESVILLE, OHIO.

IMPROVEMENT IN SMUT-MACHINES.

Specification forming part of Letters Patent No. 36,545, dated September 23, 1862.

*To all whom it may concern:*

Be it known that I, SAMUEL B. WILLIAMS, of Baresville, in the county of Monroe and State of Ohio, have invented a new and Improved Smut-Machine; and I do hereby declare that the following is a full, clear, and exact description of the same, reference being had to the accompanying drawings, making a part of this specification, in which—

Figure 1 is an elevation of my invention; Fig. 2, an enlarged vertical section of the same, taken in the line $x\,x$, Fig. 3. Fig. 3 is a plan or top view of the same; Fig. 4, a detached horizontal section of the scouring and beating device, taken in the line $y\,y$, Fig. 5; Fig. 5, a detached elevation of the lower part of the scourer and beater, the shell being in section, taken in the line $z\,z$.

Similar letters of reference indicate corresponding parts in the several figures.

This invention consists in the employment or use of a series of suction-blast spouts, a fan, and a beating and scouring device arranged in such a manner that the grain will in passing through the machine be subjected to several blasts from one and the same fan, and the grain thoroughly scoured and all impurities separated from it.

To enable those skilled in the art to make and use my invention, I will proceed to describe its construction and operation.

A represents an upright framing, which may be constructed in any proper way to support the working parts of the machine, and B is a fan-case, which is placed in the upper part of the framing A, and is provided with an eduction-spout, C. D is a vertical shaft, which is placed centrally in the framing A, and on which the fan E, which is in the case B, is placed. This fan E may be constructed in the ordinary way, and therefore does not require a minute description.

On the shaft D, below the fan-case B, there is placed a beater, F, which is formed of two or more sets of radial arms, $a$, through which, near their ends, rods $b$ pass vertically, there being a series of rods passing through each arm, as shown in Fig. 4, the arms of the several sets being in line with each other. The rods $b$ are parallel with each other, and their lower ends are fitted into the upper surface of a circular scourer, G, which is also placed on the shaft D, and is toothed or corrugated at its periphery, as shown at $c$ in Fig. 5. The beater F and scourer G are encompassed by a shell, H, the upper part of which is of cylindrical form, and has a series of vertical rods, $d$, fitted within it adjoining its inner side, said rods extending the whole height or length of the cylindrical part of the shell. The lower part of the shell is of conical form, corresponding to the form of the scourer G, and it is toothed or corrugated at its inner side, as shown at $e$. The inclination of the lower conical part of the shell H is not so great as the inclination of the scourer G, as will be seen by referring to Fig. 2. The shell H rests on a horizontal plate, I, in the framing A, and the shaft D is driven by a belt, J, from a shaft, K, which is rotated by any convenient power. L M N O represent four blast-spouts. The spout L has a horizontal position, and communicates at its inner end with the upper part of the fan-case B, and communicates at its outer end with the spout M, which extends upward and is curved so as to pass horizontally over the top of the machine to about the center of the same, and communicates with the spouts N O, one of which, N, extends down to the hopper P, into which the grain to be operated upon passes. The other spout, O, extends downward at the opposite side of the framing A, and communicates with the lower part of the shell H by means of an inclined spout, Q. In the inner end of the horizontal spout L there is fitted a valve, R, which opens inward, and is connected by a rod, $f$, with a spring, $g$, which is coiled around a rod, $h$, fitted in bearings $i$, attached to the inner end of said spout, the strength of said spring being graduated by turning or adjusting the rod $h$, as will be fully understood by referring to Fig. 3.

The operation is as follows: When the shaft D is rotated, a suction-blast is created in the spouts L M N O, the blast passes through the case B, and is expelled through the spout C. The grain passes into the lower end of the spout N, and thence into the hopper P, and is directly exposed to a suction blast in the spout N, which abstracts many loose light impurities. The grain passes from the hopper into the shell H, and is thoroughly beaten by the rotation of the rods $b$ and the attrition caused by the grain being forced against the stationary rods $d$ of the shell H. By this beating operation the grain has the dirt detached from it and smut is broken and pulverized. The grain, after being beaten, is subjected to a scouring process in passing down between the scourer G and the lower conical part of the shell H, and all dirt, smut, or other foreign substances which may remain on the grain is detached therefrom. The grain passes from the shell H through the inclined spout Q into the lower part of spout O, where it is subjected to another suction-blast and deprived of all loose light impurities. Light or shrunken grain which may be carried up in the spouts N O passes into spout M, and is discharged from the the lower end of the latter. The strength of the suction-blasts L M N O may be regulated as desired by regulating the strength of the spring $g$ of the valve R, as previously described. By this arrangement a very compact and simple smut-machine is obtained, and one by which grain will be thoroughly cleansed from all impurities. The subjecting of the grain to different blasts successively at different stages of the cleaning process constitutes an essential feature of the invention. The beating device formed of the rotating rods $b$ of the arms $a$ and the stationary rods $d$ of the shell H serve to cleanse the grain, while the scourer G, in connection with the lower conical part of the shell H, effectually scour off all dirt and smut which may be agglutinated to the grain.

I would remark that the scouring device may be adjusted to act in a greater or less degree upon the grain by raising or lowering the shaft D, through the medium of a bridgetree, $a^x$, in which the shaft is stepped.

I do not claim, broadly, the employment or use of vertical beaters, for they have been previously used; nor do I claim, irrespective of the arrangement herein shown and described, the employment of one or more suction-blasts, for they also have been used; but I do claim as new and desire to secure by Letters Patent—

1. The suction-spouts L M N O, when arranged and combined with a fan-case, B, beater F, scourer G, and shell H, to operate as and for the purpose herein set forth.

2. The particular arrangement and combination of the vertical rotating rods $b$ of the arms $a$ and the stationary rods $d$ of the shell H with the conical scourer G and the lower conical part of the shell H, to form a new and improved beating and scouring device, for the purpose specified.

3. The combination of the blast-spouts, fan, fan-case, and beating and scouring device, when all arranged for joint operation, as and for the purpose herein set forth.

SAMUEL B. WILLIAMS.

Witnesses:
J. W. PATTERSON,
W. B. ONEILL.